UNITED STATES PATENT OFFICE.

MOSES FIELD FOWLER, OF BOSTON, MASSACHUSETTS.

PRESERVING THE AROMA OF COFFEE.

SPECIFICATION forming part of Letters Patent No. 298,684, dated May 13, 1884.

Application filed June 11, 1883. (No specimens.)

*To all whom it may concern:*

Be it known that I, MOSES FIELD FOWLER, of Boston, in the county of Suffolk and Commonwealth of Massachusetts, have invented a new and useful Improvement in Treating Coffee, which is fully described in the following specification.

This invention relates to that class of compounds used in the treatment of coffee; and it consists in a composition formed by combining and incorporating with the coffee the essence or properties of flaxseed in the manner hereinafter set forth.

Coffee, it is well known, in the raw or natural condition, and at all times, has an absorbent property by which it absorbs the taste and smell of other substances with which it comes in contact or to which it is exposed, (and hence cannot be shipped with spices,) and especially when roasted and the pores expanded, this peculiar quality is greatly augmented. Coffee contains also volatile qualities termed "caffaone," which escapes at all times, but more freely when roasted or ground. It also contains caffeine, which gives it a bitter taste and produces, when used as a beverage, according to Runge, Liebig, and others, palpitation of the heart, great irregularity of the pulse, oppression of the chest, pain in the head, confusion of the senses of hearing and seeing, sleeplessness, and delirium. It is also well known that the quality of coffee is greatly improved by age, as a slow fermentation goes on in the kernel by which the rank and bitter taste is eliminated. Flaxseed, it is well known, has a quick penetrant quality, and is also a demulcent and diuretic, and is used by physicians for its great soothing properties, especially in the treatment of diseases when the mucous membranes of the respiratory, digestive, urinary, and other organs are affected. By using flaxseed in combination with coffee, as hereinafter stated, the coffee will not absorb foreign tastes or smells, the aroma or caffaone is retained, and the caffeine or bitter taste is overcome, and its deleterious properties, as above stated, are obviated, and when the flaxseed is combined with coffee known as "Rio" and other low grades of coffee it gives them the properties that age gives to old Java and other East India coffees. Now, in order to accomplish the results above claimed, I take one pound of flaxseed, or "linseed," as it is often called, and steep or macerate it in one gallon of boiling water (although cold water may be used) until it becomes a ropy ptisan infusion, decoction, or extract, and then strain it. I then put into this ptisan infusion, decoction, or extract as much of fresh-ground or hot roasted coffee in the berry, which, I think, is preferable, as will absorb the ptisan infusion or extract, which requires but a few minutes, and then dry with heat. The flaxseed is absorbed by and becomes a component part of the coffee. When a decoction is made of this compound in the usual manner for drinking purposes, it becomes a rich amber or sherry-wine color.

I do not limit myself to the exact or precise quantities of flaxseed or coffee, as above specified, as they may be increased or diminished to suit the demands of the trade or the taste of dealers and consumers, or the scale in which business is conducted. Albumen, glucose, or sugar may be added to suit the taste of dealers and consumers, but are not essential ingredients.

I do not claim as my invention coating, or a compound for coating, roasted coffee, the gist of the present invention consisting in the incorporating or commingling of coffee and flaxseed together in such a way and so that the flaxseed becomes a part of the coffee, they having an affinity for each other when treated as above.

I claim—

1. In the treatment of coffee to preserve its aroma and obviate its injurious properties, the improvement consisting in immersing the coffee in an infusion or decoction of flaxseed and then drying, substantially as described.

2. The process of treating coffee, consisting in steeping or macerating flaxseed in water to form an infusion or decoction, immersing the roasted coffee-berry while hot therein, and drying, substantially as described.

3. As a new article, coffee impregnated with an extract or decoction of flaxseed, substantially as described.

MOSES FIELD FOWLER.

Witnesses:
  JOSIAH W. HUBBARD,
  CHARLES L. ABBOTT.